United States Patent [19]

Fritz et al.

[11] 4,290,852

[45] Sep. 22, 1981

[54] ROOF REFLECTOR FOR A GAS-COOLED PEBBLE-BED REACTOR AND PROCESS FOR THE DISASSEMBLY OF THE ROOF REFLECTOR

[75] Inventors: Rolf Fritz, Oftersheim; Bernhard Kalden, Leimen; Karl-Friedrich Kissel, Hemsbach, all of Fed. Rep. of Germany

[73] Assignee: Hochtemperatur-Reaktorbau GmbH, Mannheim, Fed. Rep. of Germany

[21] Appl. No.: 32,434

[22] Filed: Apr. 23, 1979

[30] Foreign Application Priority Data

Apr. 21, 1978 [DE]  Fed. Rep. of Germany ....... 2817540

[51] Int. Cl.³ ............................................. G21C 11/06
[52] U.S. Cl. .................................. 176/58 PB; 176/84
[58] Field of Search ........................ 176/58 PB, 84, 30

[56] References Cited

U.S. PATENT DOCUMENTS

| 3,607,643 | 9/1971 | Paget | 176/84 |
| 3,728,221 | 4/1973 | Waldis | 176/84 |
| 4,110,158 | 8/1978 | Maly et al. | 176/58 PB |
| 4,121,973 | 10/1978 | Mysels et al. | 176/84 |

FOREIGN PATENT DOCUMENTS

| 2631408 | 1/1978 | Fed. Rep. of Germany | 176/58 PB |
| 2817541 | 10/1979 | Fed. Rep. of Germany | 176/58 PB |
| 1217141 | 12/1970 | United Kingdom | 176/84 |

*Primary Examiner*—S. A. Cangialosi
*Attorney, Agent, or Firm*—Schwartz, Jeffery, Schwaab, Mack, Blumenthal & Koch

[57] ABSTRACT

The invention concerns a roof reflector suspended from the thermal cover shield of a gas-cooled pebble-bed reactor with a plurality of passages for absorber rods arranged in a triangular lattice, and with channels for the passage of the cooling gas. The roof reflector comprises a plurality of essentially hexagonal graphite blocks arranged in several layers to form vertical, closely-adjacent columns. A process for the disassembly of the roof reflector is further provided.

11 Claims, 5 Drawing Figures

ROOF REFLECTOR FOR A GAS-COOLED PEBBLE-BED REACTOR AND PROCESS FOR THE DISASSEMBLY OF THE ROOF REFLECTOR

BACKGROUND OF THE INVENTION

1. Field of the Invention

The invention relates to the construction and disassembly of roof reflectors for gas-cooled pebble-bed reactors.

2. The Prior Art

Reactor roof reflectors are known which consist of a plurality of graphite blocks arranged in close proximity to each other, suspended by means of tie rods from the upper part of the pressure vessel enclosing the nuclear reactor. A roof reflector of this type may consist, for example, of two layers of graphite blocks, wherein each of the blocks is equipped with a bore to allow for the passage of the cooling gas, the bores running in a broken line to provide shielding against neutrons. (See German Published Application DE-OS No. 15 64 186).

Another known roof reflector consists of a single layer of hexagonal graphite columns, the cooling gas passages provided centrally through the individual columns being shielded either by means of plates placed over the graphite columns or by helically wound stoppers inserted in the bores for the cooling gas (See French Pat. No. 14 26 264).

A roof reflector consisting of hanging columns is also known, the roof reflector being suspended from a thermal cover shield. Six each of the suspended columns define an opening for an absorber rod. The columns, arranged in three layers, are provided with slits for the passage of the cooling gas, the slits of adjacent layers being offset with respect to one another to provide shielding. (See German Published Application No. DE-OS No. 23 54 540).

All of the roof constructions described above are intended for use with gas-cooled nuclear reactors employing spherical fuel elements, the so-called pebble-bed reactors. Another roof reflector for a nuclear reactor of this type consists of a supporting plate fastened by means of threaded connections to the cover of the pressure vessel, and a plurality of graphite blocks arranged in at least two layers, a free space being provided between the supporting plate and the graphite blocks, the free space serving as a collector space for the cooling gas. (See German Published Application No. DE-OS No. 26 31 408). The graphite blocks are fastened to a retaining plate which closes off the lower boundary of the cooling-gas collector space and which is suspended by means of anchors from the supporting plate. The supporting plate and the retaining plate together constitute a static plate. Both consist of sections having overlapping junctions. Passages for the absorber rods are provided in the roof reflector. The flow of cooling gas passes through annular channels arranged coaxially in relation to absorber rods and possessing two different non-coincident, passage cross-sections. The cross-section of the upper passage is shielded in each case by means of an annular plate.

SUMMARY OF THE INVENTION

The present invention is based on the state of the art described above and has as its object the design of a roof reflector generally of the type described, in which the graphite blocks may be readily removed in a simple manner from their positions relative to the reactor core for the purpose of replacement with similar new parts or for repairs on other reactor installations. Further, in the design of the roof reflector, the absorber rods are arranged in a triangular lattice according to a predetermined pattern.

The object is attained according to the invention in that each group of three adjacent columns of blocks is combined to form a unit, the columns being held by a support block centrally located beneath at least a portion of the three graphite blocks of the lowest layer of each unit and fastened by means of a releasable hanger bolt to the thermal cover shield. The hanger bolt is passed in the upward direction through a central bore provided in each of the units. The graphite blocks of the lowest layer of each unit interlock with the associated support block and graphite blocks forming upper layers of each unit are locked in position in the axial direction by means of positive fitting elements provided on the faces of the graphite blocks. One sidewall of each unit is shaped such that each group of three abutting units defines a passage for receiving an absorber rod. Only one absorber rod passage is associated with each unit. Each of the graphite blocks is preferably provided at its upper face with a gripper bore.

The roof reflector according to the invention may be assembled by the simple stacking upon one another of the graphite blocks, and preferably comprises three superposed layers of the blocks. The blocks of the lowest layer of each unit interlock with an associated support block up to about one-third of their length and are advanced to the lower edge of the roof reflector (corresponding to the lower edge of the support blocks). The lower portions of blocks of the intermediate and the uppermost layers, respectively, have fitting elements machined onto them for interlocking with mating fitting elements machined onto the upper portions of blocks of the lower and intermediate layer, respectively. Except for the anchoring of the lower layer of each unit on the corresponding support block and the axial locking in position of the other blocks of each column of blocks, there is no other inter-connection between the graphite blocks within a unit. Likewise, there is no frictional interconnection between adjacent units. During disassembly of the roof reflector, the graphite blocks may be separated from one another by means of simple lifting; for this, a suitably-fitting dismantling tool is inserted into gripper bores in the graphite blocks. Following the removal of the graphite blocks, the support blocks may be dismantled, since they are equipped with releasable hanger bolts.

Each of the absorber rods is located in a central area between three abutting units, each of the three abutting units enclosing an angle of 120° about the associated absorber rod. As required, the predetermined positions of the absorber rods are accurately maintained in a regular triangular lattice, except for those absorber rods located near the periphery of the roof reflector. Each unit preferably has a sidewall portion shaped such that three abutting units serve to define a circular passage for receiving an absorber rod.

A portion of the circular absorber-rod passage located in the uppermost layer may have a larger diameter than the portion of the circular passage in the lower layer or layers. The diameter of the latter portion is adapted to the diameter of the absorber rods, with the provision of an adequate tolerance for curvatures and movements, respectively, of the absorber rods.

Advantageously, the shielding of each of the passages for the absorber rods is effected by means of a pair of stacked graphite sleeves arranged in the respective circular passage portions of the uppermost layer, the internal diameter of said sleeves being adapted to the diameter of the absorber rods. The graphite sleeves rest upon the graphite blocks of the layer of blocks immediately beneath the uppermost layer. Their external diameter is dimensioned so as to provide adequate tolerance with respect to the surrounding graphite blocks in order to provide compensation for radial movements or curvature of the absorber rods. Satisfactory shielding of the passages is obtained when the absorber rods are inserted, due to the different cross-sections of the passage portion of the uppermost layer relative to the other layers and due to the arrangement of the graphite sleeves, yet there is no danger of jamming the absorber rods in the passages.

Each graphite block is expediently provided on one surface with at least one groove extending in the axial direction such that the grooves of adjacently-located blocks form channels for the passage of the cooling gas. For reasons of manufacture, the cross-sectional configuration of the channels for the cooling gas may be other than circular, but the hydraulic flow section of the channels must be taken into consideration in their dimensioning.

To prevent, for reasons of shielding, the presence of openings passing in a straight line through the entire thickness of the roof reflector, only the cooling gas channel portions of the upper layers of the blocks are aligned with one another, while the cooling gas channel portions of the lowest layer of blocks are laterally offset with respect to the firstmentioned channels. The cooling gas channel portions of the upper layers have, for example, a hexagonal cross-section and, for example, two grooves may be provided for the formation of cooling gas channels in each block, with the exception of those blocks having a curved sidewall portion for defining a part of an absorber rod passage. The cooling gas channel portions of the bottom layer of blocks may be of a rectangular cross-section, and a larger number of cooling gas channels may be present in said bottom layer than in the layers of blocks thereabove.

Advantageously, horizontal channels are provided to interconnect the cooling gas channel portions of one layer of blocks with the channel portions of a superposed layer of blocks, the channels being arranged in a lower face of the graphite blocks of the second layer from the bottom. The flow of cooling gas coming from above is therefore deflected in the horizontal direction prior to entering the channel portions of the bottom layer of blocks. Gaps existing between adjacent graphite blocks may not be relied upon to permit flow of the cooling gas, because the gaps are largely closed off when the reactor is in operation.

According to the invention, the nominal width over the flats of the essentially hexagonal graphite blocks is determined by a distance a (FIG. 1a) representing the spacing between the absorber rods arranged in the triangular lattice. Thus, for example, for a triangular lattice of the absorber rods with a spacing between rods of $a = 764$ mm, the theoretical width over the flats of the graphite blocks would by approximately 254 mm. In view of the fact that gaps between the blocks are closed during operation of the reactor due to thermal expansion, the actual width over the flats of the blocks is less than the theoretical width by some tenths of a mm.

In the case of a nuclear reactor equipped with the roof reflector according to the invention and housed in a pressure vessel having a pressure vessel cover provided with armored tube passages for the insertion of absorber rods, a process is provided according to the invention for the removal of the roof reflector wherein the armored tube passages for the absorber rods are utilized for the removal of the graphite blocks from the core of the reactor. It is not necessary to withdraw the spherical fuel elements for the removal and installation of the roof reflector blocks. The armored tube passages must have an internal diameter of at least 310 mm (in the case where the blocks have a width over the flats of 254 mm, as cited as an example given above). Free space for the raising of the graphite blocks must be provided above the roof reflector. All metallic installations present in the area between the roof reflector and the thermal shield which would interfere with the dismantling of the graphite blocks must be removed or set aside during disassembly of the roof reflector.

To dismantle the roof reflector, following removal of each absorber rod, the graphite blocks resting on a support block are lifted by means of a manipulator from their positions, layer by layer, and removed from the pressure vessel through the now-unoccupied armored tube passage. Following the removal of all of the graphite blocks associated with each support block, the hanger bolt fastening the support block to the thermal cover shield is released and the support block is removed through the unoccupied armored tube passage.

The manipulator for disassembling the roof reflector, equipped with a shielding device, is placed onto the flange of the armored tube passage involved and secured in place. The roof reflector is disassembled according to a predetermined dismantling sequence. In the process, a gripper forming part of the manipulator is inserted in the bore located on the upper face of each graphite block and spread to grip the block for removal. The maximum action radius of the manipulator is, typically, approximately 400 mm. Three roof reflector units may be removed or replaced through each armored tube passage.

The graphite blocks of the uppermost layer must be lifted a distance equal to their entire length above the upper edge of the roof reflector, in order to displace them horizontally and bring them to the dismantling opening (i.e., the armored tube passage). Subsequent layers are removed in a similar manner; the horizontal shifting of the graphite blocks may, however, take place in the free space already secured. Finally, the support block is dismantled, for which purpose the hanger bolt is released from the thermal cover shield.

A preferred embodiment of the invention is illustrated in the drawings and described in detail below.

THE PREFERRED EMBODIMENT

As shown in the drawings, the roof reflector according to the invention comprises a plurality of essentially hexagonal graphite blocks 1, placed tightly against one another and arranged in three superposed layers: an uppermost layer 2, an intermediate layer 3, and a bottom layer 4. The graphite blocks 1 are grouped in the individual layers so that vertical columns of the blocks are formed. Each group of three adjacent columns of blocks 5 combines to form a unit 6, as shown, for example, in FIGS. 3 and 4.

Figure 2:
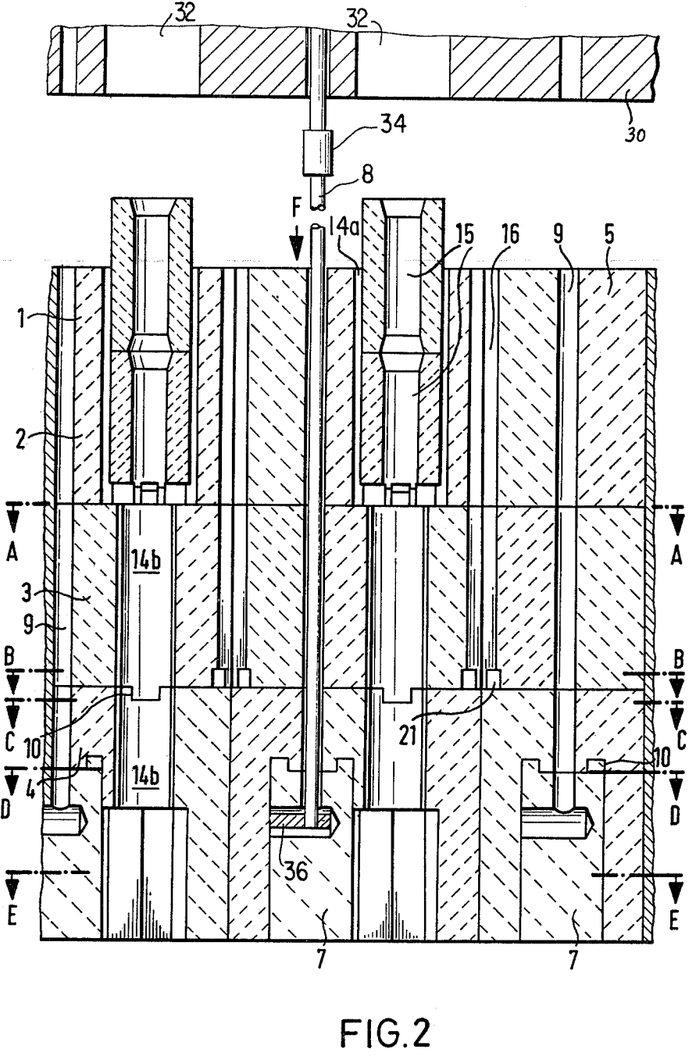
FIG. 2 shows a section taken along a vertical plane through the part of the roof reflector designated by "G" in FIG. 1, and further shows the various horizontal section planes along which the cross-sectional views of FIGS. 1a and 1b are taken.
Figure 3:
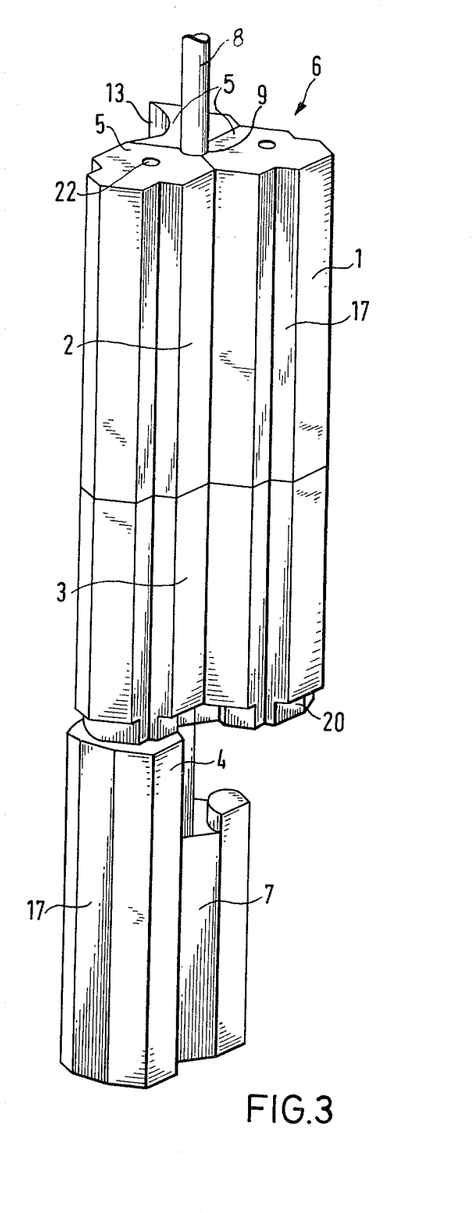
FIG. 3 shows, in perspective view, one unit of the roof reflector.
Figure 4:
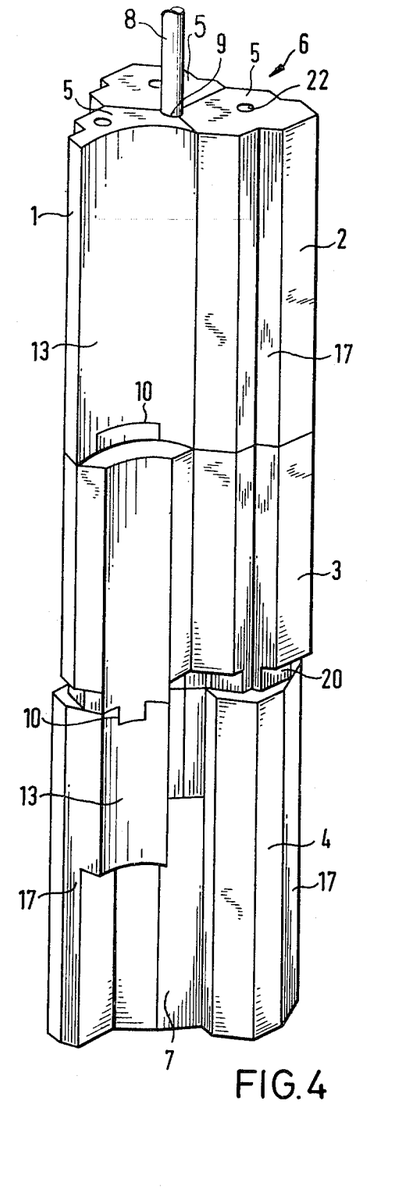
FIG. 4 shows a further perspective view of the unit of FIG. 3, taken from a different viewing angle.

Each unit 6 is held by a support block 7 arranged centrally between and beneath at least a portion of the three graphite blocks 1 of layer 4, i.e., the bottom layer. Each of the support blocks 7 is suspended by means of a respective hanger bolt 8, which is releasable by machine, from the thermal roof shield 30. A bore 9 passes centrally through each unit 6, with the hanger bolt 8 passing upwardly through central bore 9. The hanger bolt 8 is shown in FIGS. 2, 3 and 4 for only one of support blocks 7, but it will be understood that such a hanger bolt 8 is to be provided for each support block 7.

The three graphite blocks 1 of the bottom layer 4 of each unit 6 interlock with a corresponding support block 7, each block enclosing an angle of 120° about central bore 9. Each of the remaining graphite blocks 1 is secured in position in a corresponding column of blocks 5 by means of fitting elements 10 provided on mating faces of graphite blocks 1, as shown. The fitting elements 10 provided on the mating faces of graphite blocks 1 accurately fit together.

Figure 1A:
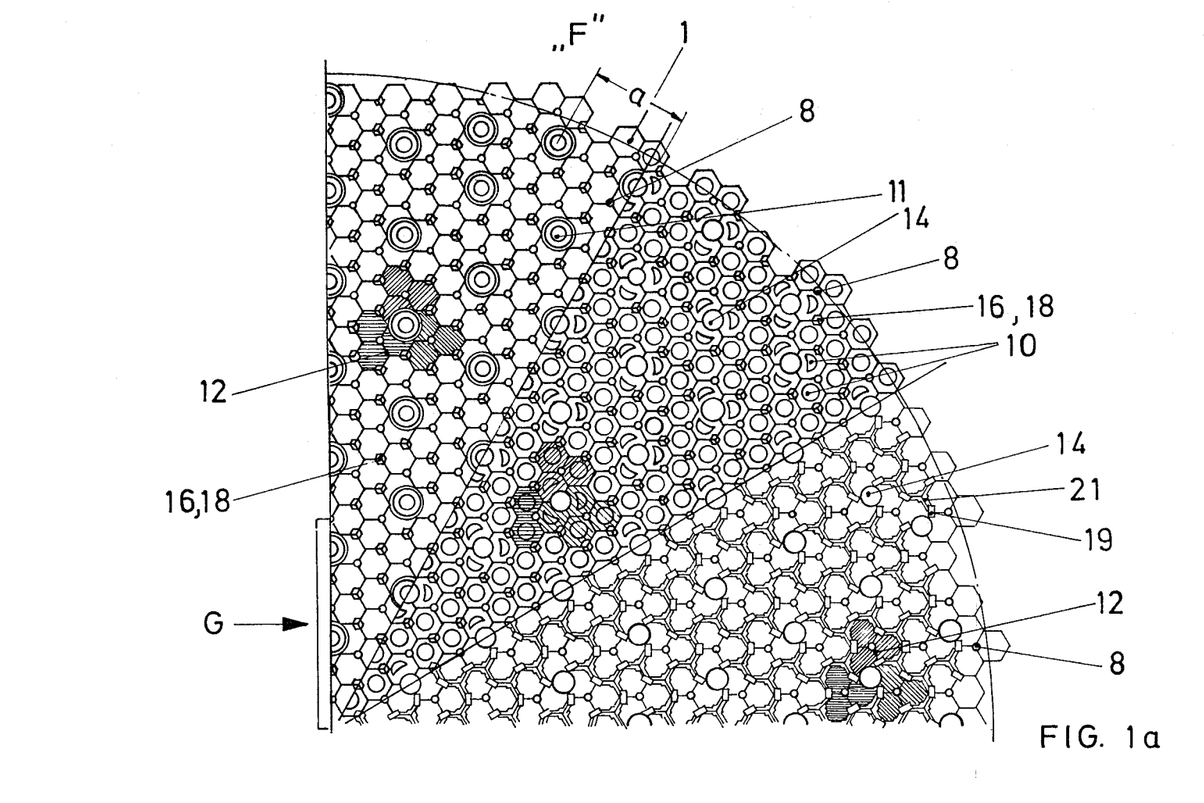
FIG. 1a shows a cross-sectional view of a part of the roof reflector, individual areas of the roof reflector being represented in different horizontal planes.
Figure 1B:
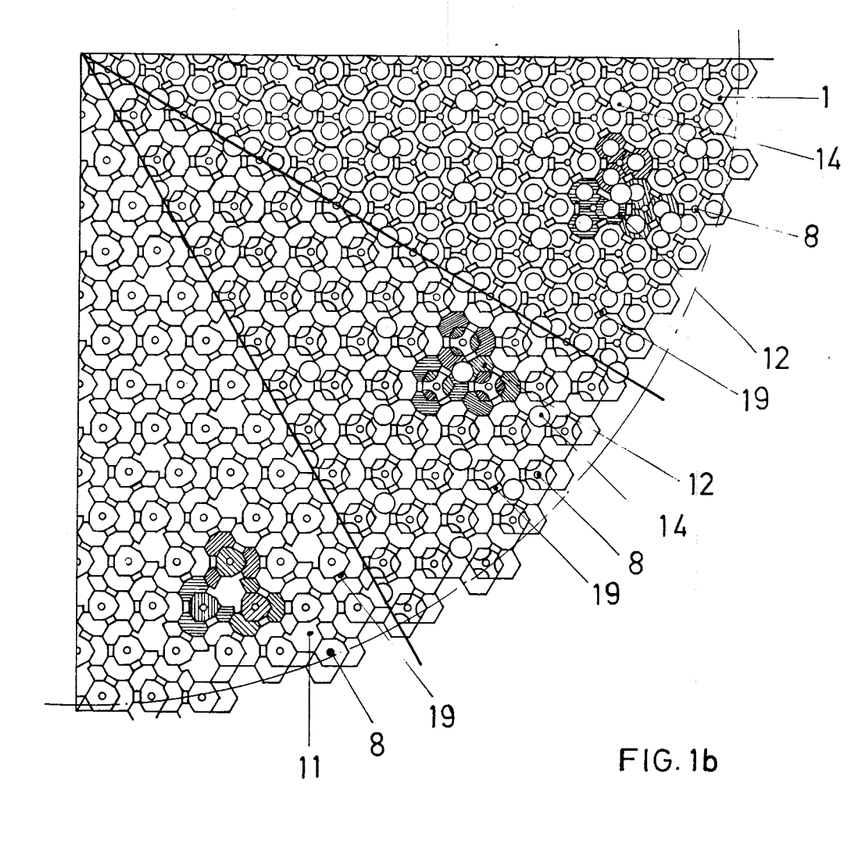
FIG. 1b shows another cross-sectional view of the roof reflector taken along additional horizontal sectional planes.

The roof reflector has a plurality of passages 11, arranged in a triangular lattice, for receiving the absorber rods. In the example illustrated, 198 absorber rod passages 11 are provided. Accordingly, the roof reflector is subdivided into 198 regions 12. Each region 12 comprises three units 6, and has a total of 30 reflector blocks (including the support blocks 7). In FIGS. 1a and 1b, a region 12 is shown in each of the different section planes, each region 12 being particularly emphasized by means of shading. Each of the three units comprising each region 12 is shaded distinctively.

In the center of each region 12, i.e., at the point where the three units 6 abut, a passage 11 for the absorber rods is provided. Each passage 11 is defined by respective grooves 13 in the immediately adjacent three columns of blocks 5 of the units 6 involved. The grooves 13 comprise sidewall portions of the respective units shaped so that together they yield a circular passage 14 for receiving an absorber rod. As seen in FIG. 2, the circular passage portions 14a in the upper layer 2 have a larger diameter than the circular passage portions 14b in the layers 3 and 4. The diameter of passage portions 14b is determined by the diameter of the absorber rods, allowing adequate tolerance for curvatures and/or movements of the rods.

In the absorber rod passage portions 14a of layer 2, two graphite sleeves 15 are stacked, their inside diameter being adapted to that of the absorber rods. The selection of the diameter of the absorber rod passage portions 14a must take into account that, on the one hand, the diameter must be large enough to provide satisfactory shielding of the open cross-sections in the layers 3 and 4 and, on the other, the diameter must be such that the graphite sleeves 15 are allowed sufficient tolerance in relation to the surrounding graphite blocks 1, in order to prevent the jamming of the absorber rods.

The center of the roof reflector is located at the center point of three columns 5 of blocks adjacently located and displaced at an angle of 120° with respect to each other. This results in a three-way rotational symmetry of the roof reflector. Because in each case three columns 5 of blocks 1 are combined by means of a support block 7 to form a unit 6, the resulting pattern yields a highly irregular separation between the roof and the side reflector; i.e., units of the roof reflector form part of the side reflector and vice versa. At the junction of the roof reflector with the side reflector, there are therefore deviations from the disassembly pattern. For the other regions of the roof reflector, the disassembly of the graphite blocks 1 and the support blocks 7 follows a pattern in which the locations of blocks surrounding each region 12 are identified to a coordinate system having x, y, z coordinates. The block location information is fed into a dismantling manipulator. Because all of regions 12 have identical structures, the same coordinate system may be used for the entire roof reflector (with the exception of the peripheral areas).

As indicated above, disassembly involves positioning of a suitable manipulator device over an armored tube passage provided in the pressure vessel cover for the insertion and removal of absorber rods. The armored tube passages are in line with absorber rod passages 32 in the thermal cover shield 30. The manipulator removes, layer by layer, the graphite blocks held by a support block 7, then releases the hanger bolt 8 fastening the support block 7 to the thermal cover shield 30, and removes the support block. To facilitate removal of the support block, a suitable releasable coupling 34 (FIG. 2) may be provided on hanger bolt 8. As shown also in FIG. 2, a pin 36 is inserted into a horizontal bore in support block 7, the pin having a threaded vertical bore for receiving a threaded lower end portion of hanger bolt 8.

A plurality of channels 16 is provided in the roof reflector for the passage of the cooling gas, the passages being formed by grooves machined into adjacent graphite blocks 1. In the layers 2 and 3, the cooling gas channels 16 (FIGS. 1a and 2) are formed by grooves 17 (FIGS. 3 and 4) in the sidewalls of graphite blocks 1. The grooves are shaped so that at the coincidence of three abutting graphite blocks 1, a channel 18 (FIG. 1a) having a hexagonal cross-section is defined. The channels 18 of the layers 2 and 3 are mutually aligned.

Grooves 17 extending in the axial direction are also provided in the graphite blocks 1 of the bottom layer 4; these blocks are, however, arranged such that their grooves are offset in relation to the grooves 17 in the two upper layers, at the periphery of the graphite blocks 1. Thus, when the blocks are assembled, the roof reflector has no openings extending in a straight line through its entire thickness, and satisfactory shielding against escape of neutrons is provided. The grooves 17 in the lower layer 4 may be shaped as indicated, so that cooling gas channels 19 in the lower layer having rectangular cross-sections are formed. Three cooling gas channels 19 are associated with each unit 6.

In the lower front surface of the graphite blocks 1 of the intermediate layer of blocks 3, horizontal grooves 20 are provided, grooves 20 having a configuration such that at the abutting surfaces of two adjacent graphite blocks 1 a horizontal cooling-gas channel 21 is formed. Three of these horizontal cooling-gas channels communicate with each channel 18 of hexagonal cross-sections and serve to interconnect the latter with three channels 19 in the lower layer 4 having rectangular cross-sections.

FIGS. 3 and 4 shows a gripper bore 22 machined into the upper face of each graphite block 1. The gripper of a manipulator may be inserted into a bore 22 and spread to facilitate removal of the graphite block 1. The process of dismantling the roof reflector has been described hereinabove, and need not be repeated.

The disclosures of German Published Applications DE-OS No. 23 54 540, published May 15, 1975 DE-OS No. 25 09 025, published Sept. 2, 1976 and DE-OS No. 26 31 408, published Jan. 19, 1978, are expressly incorporated herein. Application DE-OS No. 23 54 540 is particularly incorporated for its teaching of a gascooled pebble-bed reactor having a roof reflector and passages for the insertion and removal of absorber rods.

Application DE-OS No. 26 31 408 is particularly incorporated for its teaching (in FIG. 1 thereof) of a roof reflector for such a reactor with inserted absorber rods as well as a support plate fastened to the liner of a pressure vessel; the support plate serves a shielding function and may be regarded as a thermal roof shield. Application DE-OS No. 26 31 408 further shows an armored tube passage for the absorber rods.

Application DE-OS No. 25 09 025 is particularly incorporated for its description of a manipulator apparatus for placement in a prestressed concrete pressure vessel. The process described in DE-OS No. 25 09 025 does not exploit the armored tube passages in the pressure vessel (as does the process of the present invention), but instead uses the loading openings for the fuel pellets. Nonetheless, DE-OS No. 25 09 025 discloses the manner of operation of a manipulator suitable for carrying out the process of the present invention.

We claim:

1. In a gas-cooled pebble-bed reactor having a thermal cover shield, a roof reflector for suspension from said thermal cover shield, comprising:
    a plurality of graphite blocks of essentially hexagonal cross-section grouped in a plurality of layers superposed such that blocks in adjacent said superposed layers are aligned to form plural adjacent columns;
    a group of three adjacent said columns comprising a supportable unit with three said blocks forming a lowermost layer of said unit, each said block being associated with only one said unit;
    a support block for supporting each said unit, each said support block arranged beneath at least a portion of said blocks forming a lowermost layer of a respective unit to be supported; and
    a respective hanger bolt for releasably fastening each said support block to said thermal cover shield,
    each said unit having an opening through which a said hanger bolt passes from a said support block to sad thermal cover shield, said blocks forming said lowermost layer of each said unit having lower means for interlocking with a respective said support block and upper means for interlocking with blocks in a said layer superposed on said lowermost layer, and each said unit having a sidewall portion shaped such that a group of three abutting said units defines a passage for receiving an absorber rod, each said unit being associated with only one said passage.

2. The roof reflector of claim 1, wherein each said block has an upper surface provided with a gripper bore.

3. The roof reflector of claim 1, wherein said shaped sidewall portion of each said unit is curved such that a group of three abutting said units defines a circular passage for receiving an absorber rod.

4. The roof reflector of claim 3, wherein each said unit has a said lowermost layer of said blocks and an upper layer of said blocks located above said lowermost layer, said shaped sidewall portion of said units being shaped such that said circular passage has a larger diameter in the region of said upper layer than in the region of said lowermost layer, and the diameter of said circular passage in the region of said lowermost layer being dimensioned to receive an absorber rod of predetermined diameter.

5. The roof reflector of claim 4, further comprising a pair of stacked graphite sleeves inserted in said circular passage in the region of said uppermost layer, said sleeves having an outer diameter determined by the diameter of said circular passage in the region of said upper layer and an inner diameter determined by the diameter of an absorber rod to be inserted in said circular passage.

6. The roof reflector of claim 1, wherein each said block has a sidewall portion grooved such that a group of three abutting said blocks defines a channel for the passage of a cooling gas.

7. The roof reflector of claim 6, wherein said plurality of blocks is arranged to form a lowermost layer, an intermediate layer, and an upper layer, each said cooling gas channel having a first channel portion passing through said upper layer aligned with a second channel portion passing through said intermediate layer and offset relative to a third channel portion passing through said lowermost layer.

8. The roof reflector of claim 7, wherein for each said cooling gas channel said third channel portion communicates with said second channel portion through a fourth channel portion defined by a substantially horizontal groove in a sidewall of each of said blocks defining said channel.

9. The roof reflector of claim 1, wherein said reactor includes a plurality of absorber rods spaced apart at a distance a from one another and arranged in a triangular lattice, each said block of essentially hexagonal cross-section having a nominal sidewall width defined by said distance a between absorber rods.

10. In a gas-cooled pebble-bed reactor contained in a pressure vessel and having a thermal cover shield, said pressure vessel and said thermal cover shield provided with a plurality of spaced-apart tube passages for the insertion and removal of absorber rods, said reactor including a roof reflector comprising a plurality of graphite blocks of essentially hexagonal cross-section grouped in a plurality of layers, and said roof reflector having a plurality of openings for receiving respective absorber rods, and said blocks in adjacent said superposed layers are aligned to form plural adjacent columns, a group of three adjacent said columns comprising a supportable unit, with three said blocks forming a lowermost layer of said unit, a support block supporting each said unit releasably fastened to said thermal cover shield by a respective hanger bolt, the process comprising removing a said absorber rod from said roof reflector through an associated said tube passage; lifting said blocks of a said unit adjacent said associated tube passage one layer at a time, and removing said blocks through said associated absorber rod tube passage; releasing said support block from said thermal cover shield; and removing said support block through said associated tube passage.

11. The process of claim 10, wherein said process is repeated for each said unit of said roof reflector.

* * * * *